Feb. 11, 1969   F. G. WARD ET AL   3,426,887

DRIVES FOR CONVEYORS

Filed Feb. 27, 1967    Sheet 1 of 5

INVENTORS
FREDERICK G. WARD
ANTHONY W. DAVEY
BY Norris + Bateman
Attys

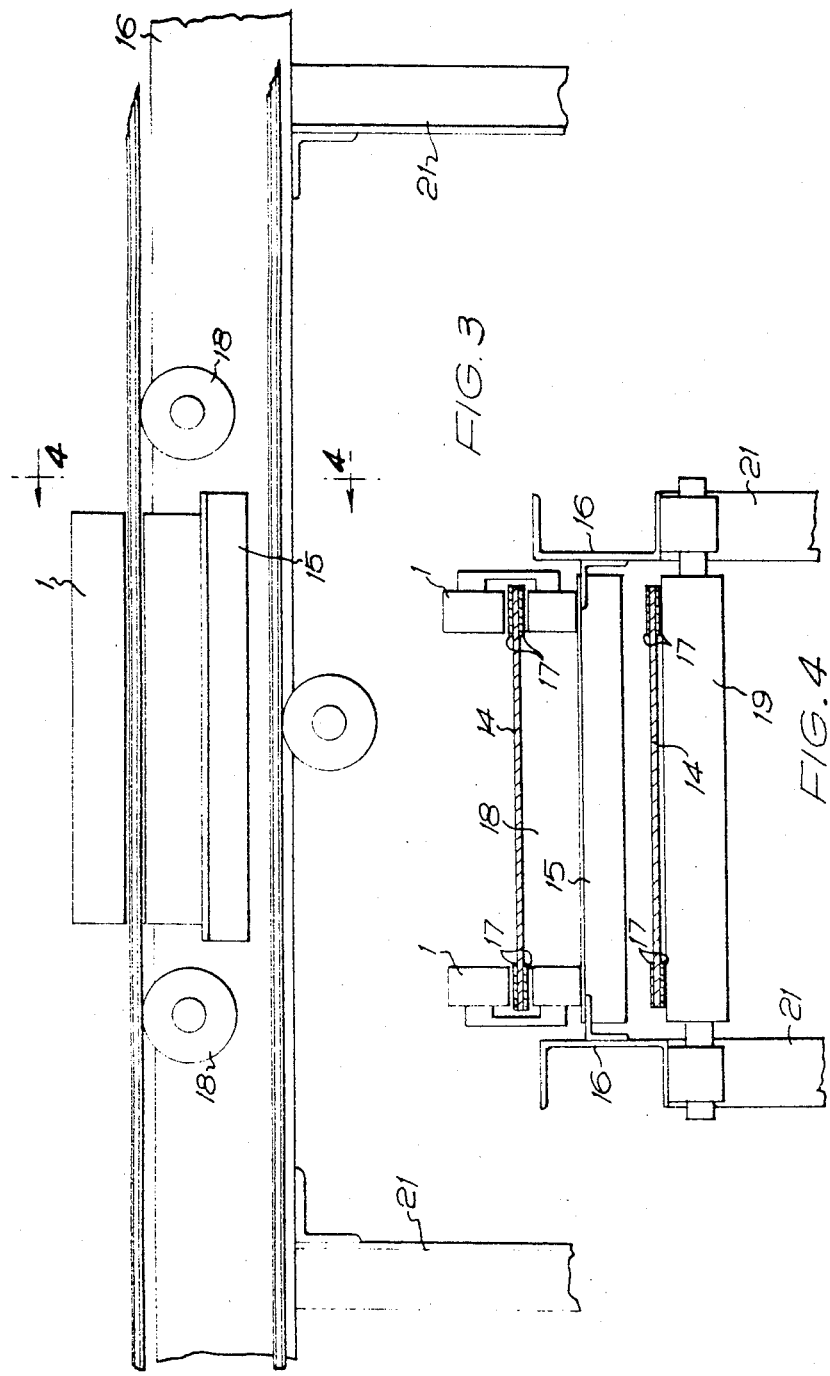

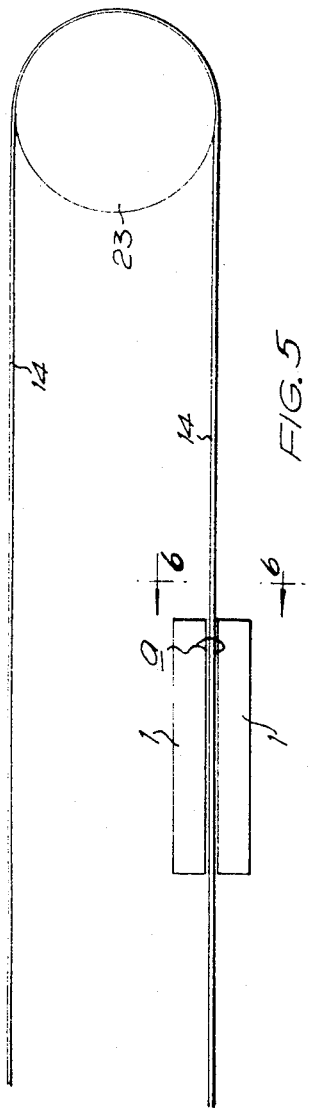
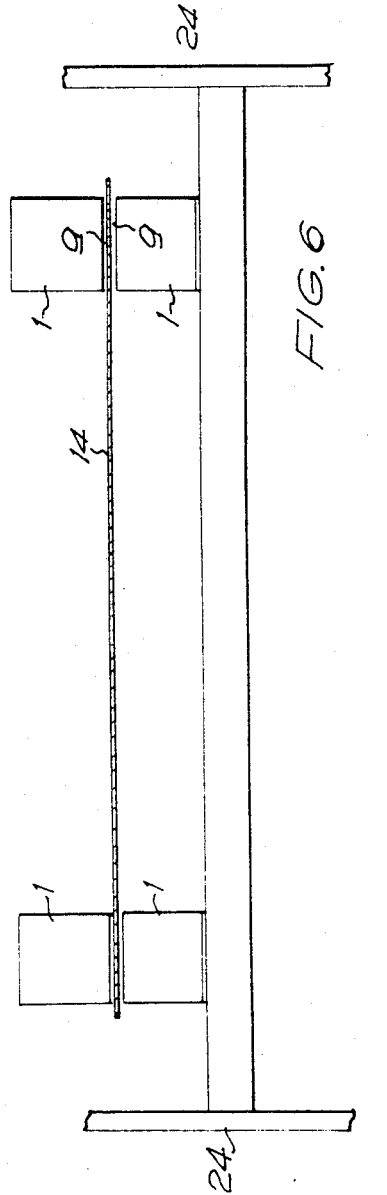

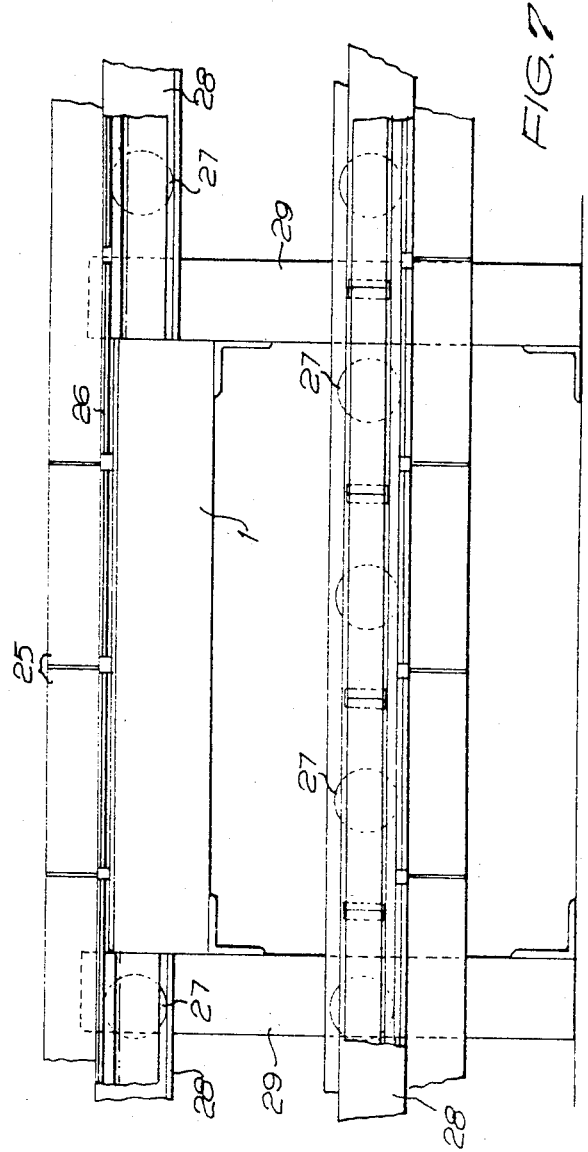

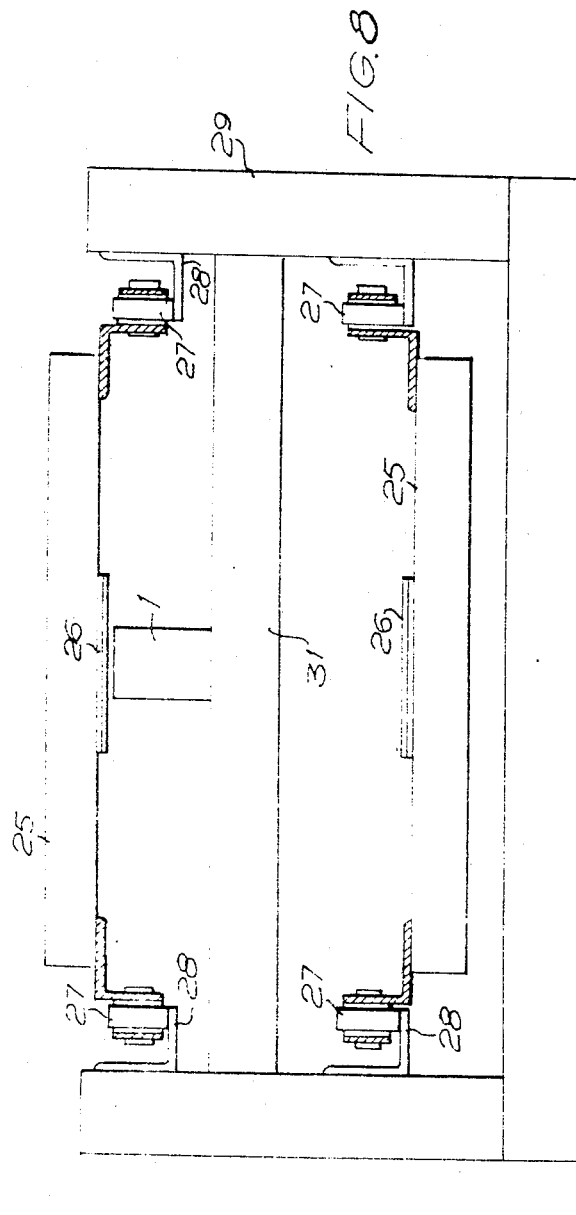

3,426,887
DRIVES FOR CONVEYORS
Frederick Gifford Ward, East Leake, and Anthony W. Davey, Long Whatton, England, assignors to Herbert Morris Limited, Loughborough, England, a company of Great Britain
Filed Feb. 27, 1967, Ser. No. 618,890
U.S. Cl. 198—177
Int. Cl. B65g 23/22, 17/20
8 Claims

ABSTRACT OF THE DISCLOSURE

A drive for conveyors in which one member of a linear induction motor is mounted on the conveyor and the other member on a stationary track.

---

This invention relates to improvements in drive units for conveyor belts or chains employing a linear motor of the type comprising two members separated by an air gap, one member being of ferrous metal and the other member a coil assembly energized by multiphase AC and having a laminated toothed core.

Shading rings have been proposed in single phase AC motors to give a preferred direction of rotation (the motor being referred to as a shaded pole motor) and it has now been found that by embedding the shading pole in the toothed core together with a winding a coil assembly is obtained in which the resultant forces will drive a band or plate lengthwise, but, should the band or plate move to one side of the motor, the shading ring on that side will produce a repelling force in the horizontal plane and should the band or plate move across the coil assembly to the other side, the other shading ring will produce a repelling force in a horizontal plane such that the band or plate is centralized with the two forces being equal, the rings at both ends of the motor teeth being combined in a solid grid or conducting material.

The invention comprises a drive unit of the type referred to for a conveyor band or chain in which a plate or band on or forming the conveyor acts as the moving ferrous member of the motor and is centralized in a horizontal plane during running by embedding a shading pole grid in the toothed core together with the windings of the coil assembly acting as a stationary member of the motor.

The invention will be described with reference to the accompanying drawings:

FIG. 3 is a diagrammatic side elevation of a conveyor belt drive unit.

FIG. 4 is a section of same on line 4—4 of FIG. 3.

FIG. 5 is a diagrammatic side elevation of a steel band conveyor drive unit.

FIG. 6 is a section on line 6—6 of FIG. 5.

FIG. 7 is a diagrammatic side elevation of a wood slat conveyor drive unit.

FIG. 8 is an end elevation of same.

A coil assembly is employed as the stationary member of the motor and a plate or band on a conveyor as the moving member of the motor.

The coil assembly comprises shading poles in the form of a grid embedded in a toothed iron core together with the coil windings, the shading grid acting to produce a centralizing force in a horizontal plane to keep the plate or band on the conveyor centralized on a runway.

Figure 1:
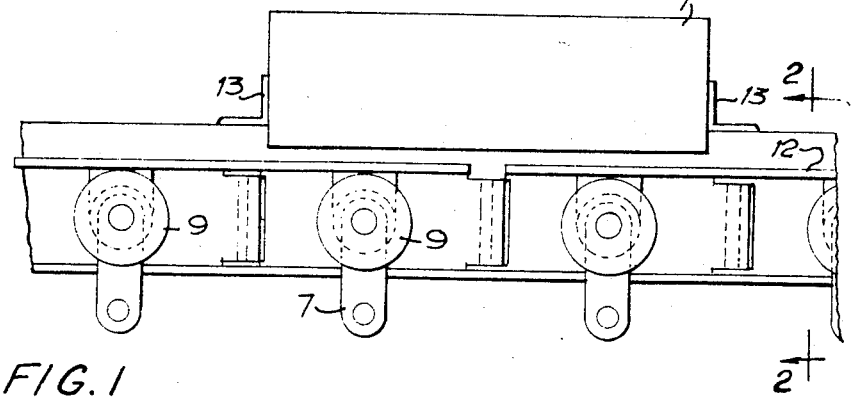
FIG. 1 is a diagrammatic side elevation of a chain conveyor drive unit.
Figure 2:
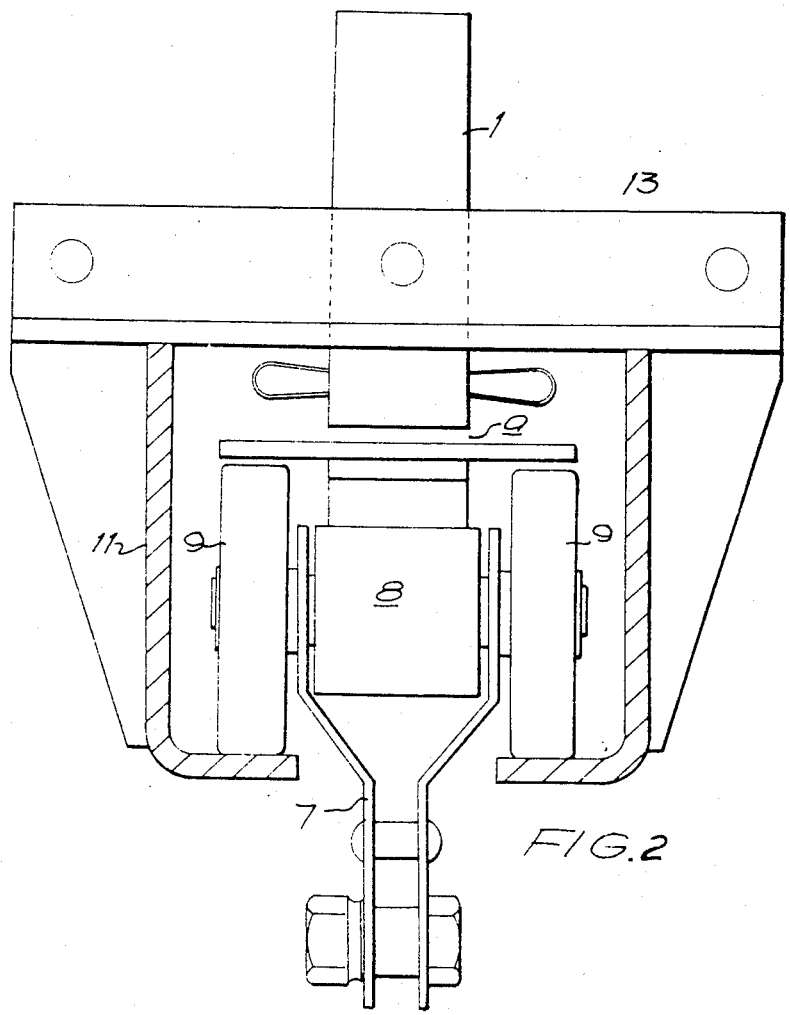
FIG. 2 is a section of same enlarged on line 2—2 of FIG. 1.

In the form shown in FIGS. 1 and 2 the conveyor chain 7 provided with runners or wheels 9 engaging flanges on a track 11 is supported on a carriage or trolley 8. The load is suspended by hooks or the like from the chain. The carriage or trolley also supports a plate 12 separated from the coil assembly 1 of the linear motor by the air gap $a$, the coil assembly being carried by track brackets 13.

When current is applied to the coils the resultant forces will cause the plate 12 to drive the runners 9 on the track 11, but should the runners 9 deviate from a central position on the track 11 the shading pole will produce a horizontal repelling force acting between the coil assembly and the plate 12 which will cause the runners 9 to reassume a central position on the track.

In the form shown in FIGS. 3 and 4 for driving a belt conveyor 14 the coil assembly 1 of the linear motor is supported by motor mountings 15 carried by channel stringers 16. In non-metal type conveyor belts 14 a metal strip 17 or wire or metal particles are introduced into or affixed to the edge of the belt to provide the driving force and form the second member of the motor.

The belt travels over rollers 18 and returns below the forward run over rollers 19, the conveyor being carried on supports 21. A separate motor may be applied to both edges of the belt as shown and both motors may be provided with shading poles.

The motor may be applied to the load carrying portion of the belt or to the return run or to both.

The form shown in FIGS. 5 and 6 for driving a steel band conveyor is similar to the arrangement described with reference to FIGS. 3 and 4 except that the belt 14 being of metal it takes the place of the metal strips 17 and serves as the second member of the motor and a coil assembly may be provided above and below the belt.

The return of the band is shown above the forward run with the band passing over rollers 23. The band travels over supporting plates mounted in a frame 24 and forms one member of the motor, the edges of the band extending in the air gap $a$ between an upper and lower series of coil assemblies mounted on the tracks. The band is endless and passes over the pulleys 23 at each end of the run and returns above the coil units.

In the form shown in FIGS. 7 and 8 for driving a slat conveyor the slats 25 either of metal or wood are provided with a metal strip 26 intermediate the ends to provide the second member of the motor the air gap $a$ being provided between the slat 25 or metal strip 26 and the coil assembly 1 of the motor. The conveyor is mounted on rollers 27 supported in angle stringers 28 mounted on a frame 29 and the conveyor returns below the forward run. The coils 1 are mounted on stringers 31 supported in the frame 29. The rollers 27 form part of a continuous chain and are carried on rods on which the ends of the slats are mounted. On short conveyors, rollers may be eliminated and end of slat arranged to slide on angle stringer.

The advantages of the above drives for chain conveyors are that as the chain or spacing linkage does not have to be designed to suit a driving wheel, no tensioning unit is required, and positive centralization of the belt or chain is possible by the provision of the coil assembly cooperating with the shading poles. The conveyors may be of any length and a plurality of coil assemblies may be employed with speed control and synchronisation of the coil assemblies.

What we claim is:

1. A drive unit for conveyor means comprising a linear induction motor having a first stationary member and a second movable member, said stationary member including a coil assembly mounted adjacent said conveyor means, the coil assembly having an iron core with slotted teeth in which a shading pole grid is received, said conveyor means including metallic means forming said second movable member, said coil assembly spaced from said metallic means by an air gap and operatively linked therewith by a magnetic inductive flux to produce movement of said conveyor means, said shading pole grid functioning to centralize said conveyor means in a horizontal plane during movement thereof.

2. A drive unit for a conveyor as in claim 1 employing a plurality of coil assemblies in combination with means for speed control and synchronisation of the motors.

3. A drive unit as in claim 1, said conveyor means being a conveyor belt on which said metallic means is mounted.

4. A drive unit as in claim 1, said conveyor means being a metallic belt which acts as said second movable member.

5. A drive unit as in claim 1, said conveyor means comprising carriage means provided with wheel members engaging flanges on a track, a plate supported on said carriage means and forming said second movable member, said plate and said coil assembly causing movement of said carriage means on said track.

6. A drive unit as in claim 1, comprising stringers, motor mountings carried by said stringers and said coil assembly supported by said mountings, said conveyor means being a belt having metal conductors forming said second movable member and separated from said coil assembly by an air gap to provide the driving force for said belt.

7. A drive unit for a conveyor as in claim 6 comprising coil assemblies mounted above and below the belt at each side of the belt and metal edges on the belt extending between the two portions of the coil assemblies and separated from both portions by air gaps and providing the driving force for the belt.

8. A drive unit as in claim 1, comprising a track having a frame and angle stringers thereon, said coil assembly being supported by said frame, said conveyor means being a slat conveyor having rollers which travel over said angle stringers, a metal strip mounted on each slat intermediate the ends thereof to provide said second movable member of said motor and separated from said coil assembly by an air gap.

References Cited

UNITED STATES PATENTS

| | | | |
|---|---|---|---|
| 2,831,131 | 4/1958 | Klotz | 310—13 |
| 3,218,489 | 11/1965 | Sadler | 310—13 |
| 3,273,727 | 9/1966 | Rogers | 310—13 |
| 3,335,300 | 8/1967 | Von Brimer | 310—13 |

FOREIGN PATENTS 165,487  10/1955  Australia.

RICHARD E. AEGERTER, *Primary Examiner.*

U.S. Cl. X.R.

198—41, 203; 310—13